United States Patent [19]

Morganelli

[11] Patent Number: 5,454,909
[45] Date of Patent: Oct. 3, 1995

[54] LOW-DENSITY HOT MELT ADHESIVE

[75] Inventor: Paul L. Morganelli, Newmarket, N.H.

[73] Assignee: The Dexter Corporation, Seabrook, N.H.

[21] Appl. No.: 299,529

[22] Filed: Sep. 1, 1994

Related U.S. Application Data

[63] Continuation of Ser. No. 220,160, Mar. 30, 1994, abandoned.

[51] Int. Cl.$^6$ .................... D21C 9/08; C80J 9/32; C08L 93/04; C08K 3/40
[52] U.S. Cl. .................... 162/55; 162/4; 162/5; 523/218; 523/219; 524/270; 524/271; 524/272; 524/274
[58] Field of Search ............ 162/4, 5, 55; 523/218, 523/219; 524/270, 271, 272, 274

[56] References Cited

U.S. PATENT DOCUMENTS

| | | | |
|---|---|---|---|
| 2,861,002 | 11/1956 | Britton | 524/169 |
| 3,284,282 | 11/1966 | Immel | 162/4 |
| 3,419,641 | 12/1968 | Peterkin et al. | 525/156 |
| 3,884,750 | 5/1975 | Iannazzi | 162/4 |
| 4,155,839 | 5/1979 | Seifert et al. | 162/4 |
| 4,283,317 | 8/1981 | Murphy et al. | 524/272 |
| 4,360,120 | 11/1982 | Samuel et al. | 524/494 |
| 4,415,615 | 11/1983 | Esmay et al. | 428/40 |
| 4,704,201 | 11/1987 | Keck et al. | 162/4 |
| 4,781,794 | 11/1988 | Moreland | 162/5 |
| 5,010,120 | 4/1991 | Sugiura | 523/219 |
| 5,026,752 | 6/1991 | Wakabayashi et al. | 524/71 |
| 5,102,733 | 4/1992 | Zawadzki | 162/4 |
| 5,131,980 | 7/1992 | Chamblee et al. | 162/4 |
| 5,192,397 | 3/1993 | Bohman | 162/4 |
| 5,192,612 | 3/1993 | Otter et al. | 428/355 |
| 5,310,803 | 5/1994 | Hansen | 524/271 |

FOREIGN PATENT DOCUMENTS

| | | | |
|---|---|---|---|
| 0534393 | 3/1993 | European Pat. Off. | 523/219 |
| 0064682 | 4/1984 | Japan | 523/219 |
| 0089582 | 4/1988 | Japan | 523/219 |

OTHER PUBLICATIONS

"Reduce Part Weight and Cost With Hollow Microspheres for Plastics", by Dr. Elaine C. Barber, Senior Research Chemist, 3M Company, St. Paul, Minn., dated before Mar. 30, 1994, five pages.

"The Lightweight, High Strength Alternative", by 3M Company, St. Paul, Minn., dated before Mar. 30, 1994, two pages.

*Primary Examiner*—Peter A. Szekely
*Attorney, Agent, or Firm*—Pearne, Gordon, McCoy & Granger

[57] ABSTRACT

A low-density hot melt adhesive is disclosed. Low-density filler, preferably hollow glass microspheres, is added to a hot melt adhesive to provide a hot melt adhesive having a specific gravity preferably between 0.7 and 0.93. The low-density hot melt adhesive is more effectively separated from cellulosic materials such as cardboard and kraft paper during recycling operations which separate contaminants such as adhesives from cellulosic fibers based upon the density of the adhesive.

18 Claims, No Drawings

LOW-DENSITY HOT MELT ADHESIVE

This is a continuation of application Ser. No. 08/220,160, filed Mar. 30, 1994, now abandoned.

BACKGROUND OF THE INVENTION

This invention relates generally to adhesives and in particular to low-density hot melt adhesives.

DISCUSSION OF RELATED ART

A hot melt adhesive typically is solid at room temperature, melts sharply upon heating and flows substantially freely for application to various substrates. Upon cooling the adhesive hardens and bonds the substrates together. Hot melt adhesives are known in the art; see U.S. Pat. Nos. 5,026,752; 4,283,317; and 3,419,641, incorporated by reference.

Hot melt adhesives are commonly used for bonding cardboard, corrugated paper board, kraft paper, food cartons, and similar cellulosic or wood fiber materials which can be repulped and recycled in the secondary fiber industry. See U.S. Pat. No. 4,781,794, incorporated by reference. In the recycling process, such cellulosic material, containing hot melt adhesive and other contaminants, is fed into a pulper, which comminutes the cellulosic material and combines it with water to form a pulp slurry which is typically warmed to 120°–140° F. Processing is then performed to separate out the hot melt adhesive so it does not create "stickies" in the finished paper stock. Through flow or reverse cleaners are designed to remove low-density contaminants and forward cleaners are designed to remove high-density contaminants. It has been suggested to add high-density fillers such as talc and calcium carbonate to hot melt adhesive to increase the specific gravity thereof and make it easier to separate from the pulp slurry.

It is known to use certain relatively lower-density base polymers to achieve a lower-density hot melt adhesive. For example, it is known to use polyethylene in hot melt adhesive to lower the specific gravity below 1 to facilitate removal from the pulp slurry. The use of polyethylene and amorphous polyolefins has been suggested, with the resultant hot melt adhesives having specific gravities typically from 0.92 to 0.95. It is believed that other base polymers used in the hot melt art, such as ethylene propylene butene terpolymer, which can be used relatively uncompounded, have a specific gravity of 0.86.

However, all of these approaches are not satisfactory. The lower-density base polymers used have restricted or limited capabilities and are not sufficiently versatile. Polyethylene is expensive, has less flexibility, tends to be useful with a more limited number of substrates, and is compatible with a narrower range of tackifiers. Amorphous polypropylene and ethylene propylene butene terpolymer have a relatively slow set. What is needed is a way to make a hot melt adhesive low density without having to rely on the specific gravity of the base polymer, tackifier, or wax. This can be achieved by adding a low-density filler to just about any hot melt adhesive composition, without regard to its unfilled specific gravity. The worker in this field will now not be restricted in his formulating and will be able to achieve low densities not presently obtainable. This is particularly useful to EVA-based hot melt adhesives, which are particularly versatile, being useful with a wide range of substrates and being compatible with a wide range of tackifiers. Low-density EVA-based hot melt adhesives are not generally available, since EVAs tend to have specific gravities of 0.96 and above. Low-density hot melt adhesives using higher-density tackifiers will now also be available. There is a need for a class of versatile, effective hot melt adhesives having a specific gravity in the range of about 0.7 to 0.93 to make separation easier and more effective.

SUMMARY OF THE INVENTION

A low-density hot melt adhesive is disclosed, preferably comprising from 10 to 99.7 weight percent base polymer selected from the group consisting of polyethylene, polypropylene, polybutene, ethylene-vinyl acetate, ethylene-ethyl acrylate, ethylene-acrylic acid, ethylene propylene copolymer, ethylene propylene butene terpolymer, styrene block copolymer or mixtures thereof, from 0 to 85 weight percent tackifier, from 0 to 50 weight percent wax, and at least 0.1 weight percent low-density filler, said adhesive being effective as a hot melt adhesive and having a specific gravity at 70° F. not greater than 0.93. Also disclosed are a method of bonding two cellulosic substrates using the disclosed adhesive and a method of separating cellulosic material from the disclosed adhesive to yield recyclable cellulosic material.

DETAILED DESCRIPTION OF THE PREFERRED EMBODIMENTS

Typical hot melt adhesives are made with a base polymer which is a polymeric thermoplastic material which is solid at 70° F., the base polymer being typically compounded with one or more tackifiers and preferably one or more waxes. The low-density hot melt adhesives of the present invention are made by adding a low-density filler to a hot melt adhesive.

The preferred base polymers of the present invention are the following, or mixtures thereof: polyethylene, polypropylene, polybutene, ethylene-vinyl acetate (EVA), ethylene-ethyl acrylate, ethylene-acrylic acid, ethylene propylene copolymer, ethylene propylene butene terpolymer, and styrene block copolymer. Of these, the more preferred are EVA, ethylene propylene copolymer, and ethylene propylene butene terpolymer. Generally, EVA is preferred over polyethylene as a base polymer because it has broader compatibility with tackifiers and polyethylene tends to be expensive. Styrene block copolymers (there are several types known in the art) are the principal base polymer for pressure sensitive hot melt adhesives, which are hot melt adhesives which are particularly tacky when solid. The base polymer provides bulk and strength.

Typically one or more tackifiers are added. They lower the viscosity and provide tack or adhesion. These tackifiers should be compatible with the base polymer, i.e., should not separate upon standing in liquid or molten form, and are preferably highly oxidatively stable. Among the naturally-occurring resins which may be used are polyterpenes, rosins, rosin esters and derivatives thereof. Hydrocarbon resins, particularly those with 5 and 9 carbons, terpenes, terpene/phenolics, polymerized a- and B-pinenes, rosin-modified phenolic resins, polymerized rosin, rosin derivatives such as hydrogenated and dimerized rosins, and tall oil rosins may be used as tackifiers. Various synthetically-produced tackifying resins may also be employed, examples of which include aliphatic and aromatic hydrocarbon resins. Examples of other resins which may be used include modified terpenes, coumarone-indenes, polyesters, alkyl phenols, and styrene oligomers. Mixtures of the foregoing tackifiers may also be used.

The tackifier is present in an effective amount, to lower the melt viscosity of the composition and improve its ability to wet the substrate, thereby improving adhesion to the substrate. The invented compositions typically and preferably contain at least 1 weight percent of tackifier.

Hot melt adhesive compositions of the invention typically contain at least 1 weight percent of one or more waxes (which are generally low-melting hydrocarbon material), which may be included to raise or lower the softening point, to improve the set times of the adhesive composition, alter its viscosity to improve its handling characteristics, and/or increase the hardness of the bond provided. Suitable waxes include low molecular weight polyethylene, microcrystalline wax, Fischer-Tropsch wax, synthetic hydrocarbon wax, paraffin wax, and mixtures of these waxes. Tackifiers and waxes suitable for use in hot melt adhesives are well known in the art; see U.S. Pat. Nos. 5,026,752 and 4,283,317, incorporated by reference.

Adhesive compositions of the invention may also contain one or more other agents known in the art such as colorants, antioxidants, and plasticizers.

To the hot melt adhesive is added a lightweight or low-density filler to provide the present low-density hot melt adhesive. A low-density filler generally has a particle density less than about 0.5, more preferably less than about 0.4, g/cm$^3$, more preferably between 0.05 and 0.3 g/cm$^3$. Polyethylene and other base polymers are not low-density fillers. The preferred low-density filler is hollow glass microspheres, such as Scotchlite glass bubbles available from 3M Company. Among the preferred Scotchlite glass bubbles is Product K1, which has a bulk density range (calculated) of 0.05–0.10 g/cm$^3$ and an average particle density of 0.125 g/cm$^3$. Preferably the glass bubbles have a maximum of 5% by weight greater than U.S. 80 mesh (177 microns).

Less preferably the low-density filler is expanded perlite, such as available from Silbrico Corp., Hodgkins, Ill. Other low-density fillers known in the filler art may be used. Among expanded perlites, the lower density expanded perlite is usually preferred. A suitable product from Silbrico is Grade Sil-35/34, which is a fine powder and has an average particle size of 35 microns, a particle size range of 1 to 150 microns, an effective particle density of 0.25 g/cm$^3$, and a dry bulk density of 0.15 g/cm$^3$. To be effective in the present,invention, the low-density filler must be able to withstand temperatures up to about 400° F. and be able to withstand the shear forces of mixing. Hollow glass microspheres and expanded perlite have these characteristics. Hollow plastic bubbles or microspheres which melt or soften and collapse or deform at about 400° F. would generally not be useful.

Preparation of the low-density hot melt adhesive is by thoroughly mixing the base polymer, tackifier and/or wax in a conventional manner typically in a molten state at about 300° F. to ensure that a substantially uniform blend is achieved, then adding the low-density filler and mixing until well-dispersed and homogenous.

Low-density hot melt adhesives of the present invention preferably have the following characteristics: softening point: at least 180° F., more preferably at least 200° F., melt viscosity: 1000–15,000 cps, more preferably 2000–6000 cps, measured at 350° F., tensile strength: at least 100 psi, shear adhesion failure temperature: 120° F. or higher, elongation at break: 10%–1000%. Low-density hot melt adhesives having these characteristics can be prepared using the disclosure herein and other conventions known in the art. A hot melt adhesive has sufficient strength to operate effectively when it has sufficient tensile strength to effectively hold substrates together.

For application to a surface, the adhesive is heated preferably until it melts, preferably to a temperature in the range of 350° to 400° F., and applied in a conventional manner to the surfaces to be joined, the surfaces then being urged or pressed together as is known in the art.

In the specification and claims, unless otherwise indicated, percentages are weight percents and parts are parts by weight. Preferred low-density hot melt adhesives of the present invention include 10%–99.7%, more preferably 20%–80%, more preferably 30%–60%, base polymer, 0%–85%, more preferably 10%–50%, tackifier, 0%–50%, more preferably 0%–20%, more preferably 5%–15%, wax, and 0.1%–10%, more preferably 0.5%–5%, more preferably 1%–3%, low-density filler. The weight percent of low-density filler may vary beyond these ranges depending on the density thereof. When low-density filler is added at amounts less than 0.1 weight percent, the improvements of the present invention are not consistently obtained. Preferably, the low-density filler is present in an amount sufficient to lower the density of the hot melt adhesive by an amount equal to at least 0.01 g/cm$^3$, more preferably at least 0.1 g/cm$^3$. For example, a hot melt adhesive with an unfilled density of 0.94 g/cm$^3$ has low-density filler added so that the density of the adhesive is lowered to at least 0.93 g/cm$^3$; at lesser amounts of filler the advantages of the present invention may not be consistently obtained. Preferably, the invented composition will have an effective amount of low-density filler so that the resultant low-density hot melt adhesive will have a specific gravity at 70° F. between 0.7 and 0.93, inclusive, more preferably between 0.8 and 0.9, inclusive. If the specific gravity is less than 0.7, there may be so much low-density filler that the adhesive will begin to lose strength such as tensile strength and become too brittle. One problem with brittle hot melt adhesive is that it breaks into smaller pieces in the pulper, and smaller pieces are harder to separate and remove. Preferably the specific gravity is at least 0.7, but may be less. Preferably the specific gravity is 0.93 or less, to provide sufficient density difference from the pulp slurry for effective separation. The benefits of the invention are particularly apparent at a specific gravity of 0.93 and less.

The invention will now be further explained with the following examples.

EXAMPLE 1

Case sealing is used to seal seams and various other surfaces of cardboard boxes, corrugated cartons, and corrugated paper board, including the seam running down the side and to glue the lid shut (where the quick set provided by a hot melt adhesive is more critical). A preferred low-density hot melt adhesive for case sealing is as follows:

1. 10 parts EVA with 18% vinyl acetate (from DuPont).

2. 30 parts EVA with 25% vinyl acetate (from DuPont).

3. 25 parts polyterpene tackifier (Piccotac 95 from Hercules, Inc.)

4. 15 parts aliphatic hydrocarbon resin tackifier (Piccopale 100 from Hercules, Inc.)

5. 20 parts Fischer-Tropsch wax (Paraflint H1 from Moore and Munger Inc., Shelton, Conn.)

6. About 1 to 3 parts hollow glass microspheres, sufficient to reduce the specific gravity to 0.7–0.93, more preferably to 0.8–0.9.

Without the hollow glass microspheres, this Example has a specific gravity of about 0.95.

EXAMPLE 2

Bookbinding hot melt adhesive is used to bind books, such as the spine of a paperback book. A preferred low-density hot melt adhesive for bookbinding is as follows:

1. 45 parts EVA with 28% vinyl acetate (from DuPont).
2. 30 parts polyterpene tackifier (Piccotac 95).
3. 15 parts Piccopale 100 tackifier (see above).
4. 10 parts Fischer-Tropsch wax (Paraflint H1).
5. About 1 to 3 parts hollow glass microspheres, sufficient to reduce the specific gravity to 0.7–0.93, more preferably to 0.8–0.9.

EXAMPLE 3

Bag closing hot melt adhesive is used as follows: the end of a bag, such as a 5 to 50 lb. bag for pet food or charcoal briquettes, is rolled over and adhesive is used to seal it closed. A preferred low-density hot melt adhesive for bag closing is as follows:

1. 20 parts EVA with 18% vinyl acetate (from DuPont).
2. 20 parts EVA with 28% vinyl acetate (from DuPont).
3. 10 parts gum rosin tackifier.
4. 5 parts alphamethylstyrene vinyl toluene copolymer (an aromatic hydrocarbon resin from Hercules, Inc.).
5. About 1 to 3 parts hollow glass microspheres, sufficient to reduce the specific gravity to 0.7–0.93, more preferably to 0.8–0.9.

EXAMPLE 4

Scotchlite K1 hollow glass microspheres from 3M Company, with a density of about 0.12 g/cm$^3$, were blended with Hysol 1X, an EVA-based hot melt adhesive available from The Dexter Corporation, Seabrook, NH, at 3% w/w. The resultant hot melt adhesive had a specific gravity of 0.845 compared to 0.96 for unfilled Hysol 1X. The filled product showed no change to melt point, had a similar melt viscosity, and showed identical tensile lap shear strength.

Generally, any hot melt adhesive known in the art can be manufactured with a low-density filler to make the low-density hot melt adhesive of the present invention.

The secondary fiber industry utilizes waste paper products and waste cellulosic and wood fiber materials as a source of paper fiber to produce recycled finished paper products. Processes have been developed in that recycling industry to separate plastics and polymeric materials such as waxes, hot melt adhesives, and other adhesives having specific gravities less than 1 and less than that of wet paper fibers from the wet paper fibers so that higher quality recycled paper fiber can be produced. A typical and common process for performing this separation is reverse centrifugal cleaning or reverse cleaning. This process, or similar processes, and the equipment used, are well known in the art and are,described in U.S. Pat. Nos. 5,131,980; 4,704,201; and 4,155,839. The contents of these patents, and the contents of the patents cited in these patents, are incorporated herein by reference.

The problem with the prior art hot melt adhesives is that they did not have sufficiently low specific gravity for easy and more effective separation from wet paper fibers in the pulp slurry. The low density hot melt adhesives of the present invention have sufficiently low specific gravities for easier, more efficient, more effective and more complete separation. Use of the present low-density hot melt adhesive in case sealing, bookbinding, bag closing, and other situations involving cellulosic or wood fiber materials facilitates the removal of the adhesive during the repulping and recycling of the cellulosic material. In a typical recycling process, repulpable cellulosic substrates such as cardboard, kraft paper, corrugated paper board, and other cellulosic and wood fiber materials, containing the present low-density hot melt adhesive, are fed into a pulper, which comminutes the cellulosic material and combines it with water to form a pulp slurry which is warmed up to about 180° F., more typically to about 120° to 140° F. The pulp slurry is then processed in a conventional manner, such as described in U.S. Pat. Nos. 5,131,980; 4,704,201; and 4,155,839, where the low-density hot melt adhesive is separated by means or techniques, such as centrifugal techniques including reverse centrifugal cleaning, which rely on the low density or low specific gravity of the hot melt adhesive, that is, the adhesive is separated from the cellulosic material based upon the density of the adhesive. The cleaned cellulosic material, substantially free from the adhesive, may then be recycled, in ways known in the art.

It is particularly difficult to separate hot melt adhesive if it has softened and/or been comminuted into very small pieces, since frictional forces impeding separation are particularly important for small particles, and small and soft particles can squeeze through screens, rendering screens less effective separators. Hot melt adhesives having a tensile strength less than 300 psi tend to be less tough and tend to disintegrate into smaller, softer, more deformable pieces which can squeeze through screens in recycling processes and thus, when filled, benefit particularly well from the present invention, since their lower density makes them more buoyant and easier to separate by centrifugation.

Although the preferred embodiments of this invention have been shown and described, it is understood that various modifications, substitutions and replacements of the components and methods may be resorted to without departing from the scope of the invention as disclosed and claimed herein.

What is claimed is:

1. A method of separating cellulosic material from low-density hot melt adhesive which is adherent to said cellulosic material so that said cellulosic material may be recycled substantially free from said adhesive, said low-density hot melt adhesive having a specific gravity not greater than 0.93 at 70° F. which low specific gravity is achieved by the incorporation of a low-density filler which (a) has a particle density below 0.5 g/cm$^3$ and (b) can withstand processing temperatures up to 400° F. and the shear of mixing without substantial damage, said method comprising comminuting said cellulosic material and adherent low-density hot melt adhesive and combining said comminuted material with water to form a pulp slurry, said adhesive being present in said pulp slurry, separating said adhesive from said cellulosic material using separating means which separate the adhesive from the cellulosic material based upon the density of the adhesive, and recovering said cellulosic material substantially free from said adhesive so that said cellulosic material may thereafter be recycled, said adhesive comprising from 10 to 99.7 weight percent base polymer selected from the group consisting of polyethylene, polypropylene, polybutene, ethylene-vinyl acetate, ethylene-ethyl acrylate, ethylene-acrylic acid, ethylene propylene copolymer, ethylene propylene butene terpolymer, styrene block copolymer or mixtures thereof, from 0 to 85 weight percent tackifier, from 0 to 50 weight percent wax, and at least 0.1 weight percent low-density filler, said adhesive being effective as a hot melt adhesive.

2. The method of claim 1, wherein said separating is done by reverse centrifugal cleaning.

3. The method of claim 1, said adhesive having a specific gravity at 70° F. not less than 0.7.

4. The method of claim 3, said adhesive having a specific gravity at 70° F. of between 0.8 and 0.9, inclusive.

5. The method of claim 1, wherein said low-density filler has a particle density less than 0.4 g/cm$^3$.

6. The method of claim 1, said adhesive having a tensile strength less than 300 psi.

7. The method of claim 1, wherein said low-density filler is hollow glass microspheres.

8. The method of claim 1, wherein said base polymer is ethylene-vinyl acetate and said adhesive is at least 20 weight percent ethylene-vinyl acetate.

9. The method of claim 1, said adhesive being free from the presence of polyethylene.

10. The method of claim 1, said adhesive comprising from 20 to 80 weight percent base polymer, from 10 to 50 weight percent tackifier, and from 0 to 20 weight percent wax.

11. The method of claim 1, said adhesive consisting essentially of (a) said 10 to 99.7 weight percent base polymer, (b) said 0 to 85 weight percent tackifier, (c) said 0 to 50 weight percent wax, and (d) said at least 0.1 weight percent low-density filler.

12. The method of claim 1, said adhesive comprising at least one weight percent low-density filler.

13. The method of claim 1, said adhesive comprising between 0.5 and 5 weight percent hollow glass microspheres.

14. The method of claim 1, wherein said base polymer is selected from the group consisting of polyethylene, polypropylene, polybutene, ethylene-vinyl acetate, ethylene-ethyl acrylate, ethylene-acrylic acid, ethylene propylene copolymer and ethylene propylene butene terpolymer.

15. The method of claim 1, wherein said low-density filler has a particle density between 0.05 and 0.3 g/cm$^3$.

16. The method of claim 15, said adhesive having a specific gravity at 70° F. of between 0.8 and 0.9, inclusive.

17. The method of claim 10, with said base polymer being ethylene-vinyl acetate, said adhesive comprising at least one weight percent wax, and said low-density filler being hollow glass microspheres.

18. The method of claim 17, said adhesive comprising from 30 to 60 weight percent base polymer, and said adhesive having a specific gravity at 70° F. of between 0.8 and 0.9, inclusive.

* * * * *